United States Patent [19]

Holowecky

[11] Patent Number: 4,768,307
[45] Date of Patent: Sep. 6, 1988

[54] PORTABLE HOTHOUSE DEVICE

[76] Inventor: Merle Holowecky, 509 Coal St., Osceola Mills, Pa. 16666

[21] Appl. No.: 23,148

[22] Filed: Mar. 9, 1987

[51] Int. Cl.⁴ ............................................. A01G 13/04
[52] U.S. Cl. ........................................................ 47/29
[58] Field of Search .................... 47/26, 29, 28, 20, 21, 47/22, 27; 135/118

[56] References Cited

U.S. PATENT DOCUMENTS

| 707,247 | 8/1902 | Merriman | 47/28 |
| 4,112,956 | 9/1978 | Small | 135/99 |
| 4,160,340 | 7/1979 | Levett | 47/28 |

FOREIGN PATENT DOCUMENTS

| 2242893 | 3/1974 | Fed. Rep. of Germany | 47/29 |
| 2512729 | 3/1975 | Fed. Rep. of Germany | 47/29 |
| 415159 | 12/1966 | Switzerland | 47/29 |

Primary Examiner—Robert A. Hafer
Attorney, Agent, or Firm—Thomas E. Sterling

[57] ABSTRACT

This invention is a light admitting plant cover device adapted to be placed on the soil and covering rows of plants and having sealing end caps attached thereto. The device has stake means extending through the cover and into the ground on both sides of said cover. These stake means may be removed from one side of said cover and act as hinges to allow the cover to be hingeably removed from the plants. The cover device may be connected and attached to other cover sections so as to extend along a row of growing plants and may be coupled to other covered sections by pin means. The cover is comprised of light admitting transparent or translucent material such as fiberglas which also acts as a heat insulator.

7 Claims, 3 Drawing Sheets

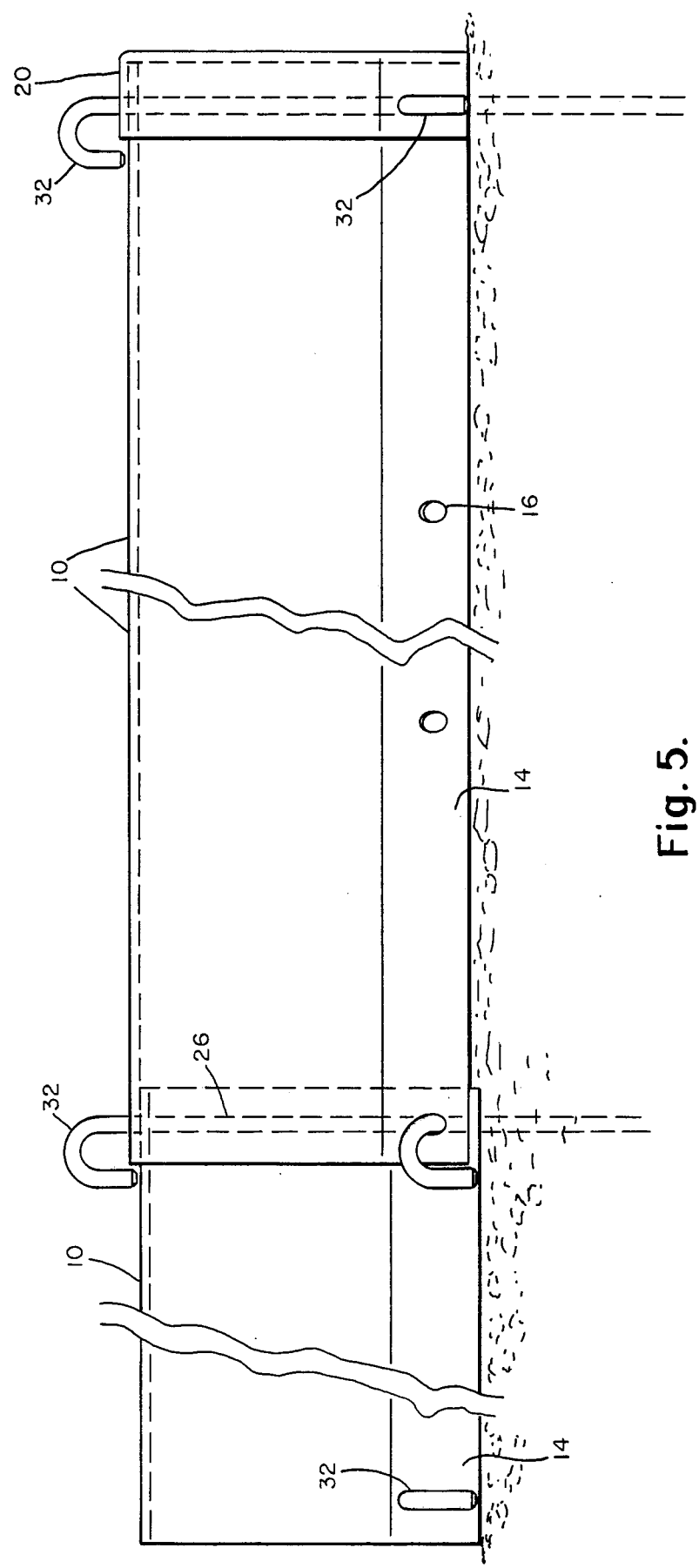

PORTABLE HOTHOUSE DEVICE

PRIOR ART STATEMENT

The inventor knows of no uncited prior art anticipating this invention. The inventor is not withholding known prior art which he considers to anticipate this invention.

This invention relates to covers placed on growing plants, and specifically to a light weight portable cover which is light admitting and which can be easily placed upon or removed from rows of growing plants.

Growing plants frequently require protection from inclement weather, temperature, wind, hail, and other weather conditions which will kill or prevent the plant from growing properly. The purpose of this particular invention is to provide a cover to protect plants, vegetables, flowers and other growing flora that are planted in rows in the open air such as a garden or flower bed. It is particularly useful in protecting strawberries, beans and peppers.

The cover is made in various lengths and heights to accommodate a variety of plant sizes as listed in the description data.

An object of this invention is to enable one to plant vegetables and flowers much earlier in the Spring and therefore to harvest such much earlier, taking advantage of a higher price. Another object is to consume vegetables earlier which are not in the normal harvesting season. This device finds much use in most sections of the United States and Canada. Vegetables and flowers can be planted three to four weeks earlier in these areas for this reason.

A translucent fiberglas cover construction acts as an insulation, protecting the plants from frost and freezing rain that prevails in early Spring. It admits light and heat and also protects the plants from late Spring frosts. This same cover may be used to protect flowers in Springtime and also from early Fall frosts. This may prolong the life of flowers for as long as six weeks.

The cover is lightweight and portable and can be easily stored between uses. The fact that the cover is translucent gives plants the light necessary for growth even if inclement weather makes it necessary to keep them covered for a period of several days or longer. This cover acts as a heat insulator and helps retain the heat of the earth that is directly beneath the covered area.

The cover sections are of various lengths and can be extended end on end to any length desired. The end caps on either end will not allow outside elements to enter into the protected area underneath the cover. The cover is anchored to the earth with hook shaped stakes at desired intervals to keep them intact.

The hook shaped stakes also act as a hinge. When all stakes are removed from one side of the cover, then the cover may be flipped over to expose the plants to the warmth and sunlight or rain in the daytime, and then flipped back at night if the weather is unfavorable, and anchored in place with the same stakes. This process is used from either side to flip the cover in the opposite direction.

In parallel rows, the covers are flipped in opposite directions to expose both rows of plants. This makes room to cultivate and weed the garden with ease.

The invention is well suited for the home gardener or a small truck farmer and flower lovers.

This invention will enable people to grow and enjoy fresh vegetables earlier and give them bragging rights over their neighbors. The cover is durable and with reasonable care in handling and storage, should last many years.

The dimensions found most practical for this invention are as follows: The cover is semi-cylindrical or horseshoe shaped with a 1½", 45° angle reinforced flange at the bottom end with ½" holes drilled at 2' intervals for the purpose of anchoring cover to the earth with a stake. The stakes are 6" long by ⅜" diameter, shaped like a walking cane, having a one inch (1") downward curve to act as a hook or hinge to secure cover to the earth. End caps are made in the shape and size of the cover circumference with a 1½" flange to insure stability and protection on either ends of cover. End caps have 3 holes drilled for insertion of stakes or pins to secure them to the cover. The cover is a device that varies from two feet to twelve feet in length with a vertical height of eight inches to sixteen inches to accommodate various sizes of vegetables or flowers.

The purpose of this invention is to provide a device to protect plants and vegetables that are planted in rows in the open air, such as a garden or flower bed.

Another object of this invention is to provide a device which will enable one to plant vegetables, flowers and other flora earlier than weather conditions would permit.

Yet another object of this invention is to provide a protective device which will shield growing plants from adverse weather conditions and will create and store heat about the plant allowing it to grow more satisfactorily.

Still another object of this invention is to provide a protective device which may be clamped to the earth and which may be rotated on hinges to expose the plant.

Still another object of this invention is to provide an elongated cover-like plant device, the covers of which may be attached together to cover rows of growing plants.

Still another object of this invention is to provide an elongated plant covering device which will admit light and warming rays of the sun.

Yet another object of this invention is to provide a plant covering device which may be anchored to the earth and yet easily removable from the plant.

Another object of this invention is to provide a plant covering device which has end caps thereon to prevent inclement weather from affecting the covered plants.

These and other objects of the invention may be seen by reference to the following drawings, specification and claims.

FIG. 5, is a lateral view of the invention showing the coupling of one cover section to a second cover section.

Figure 1:
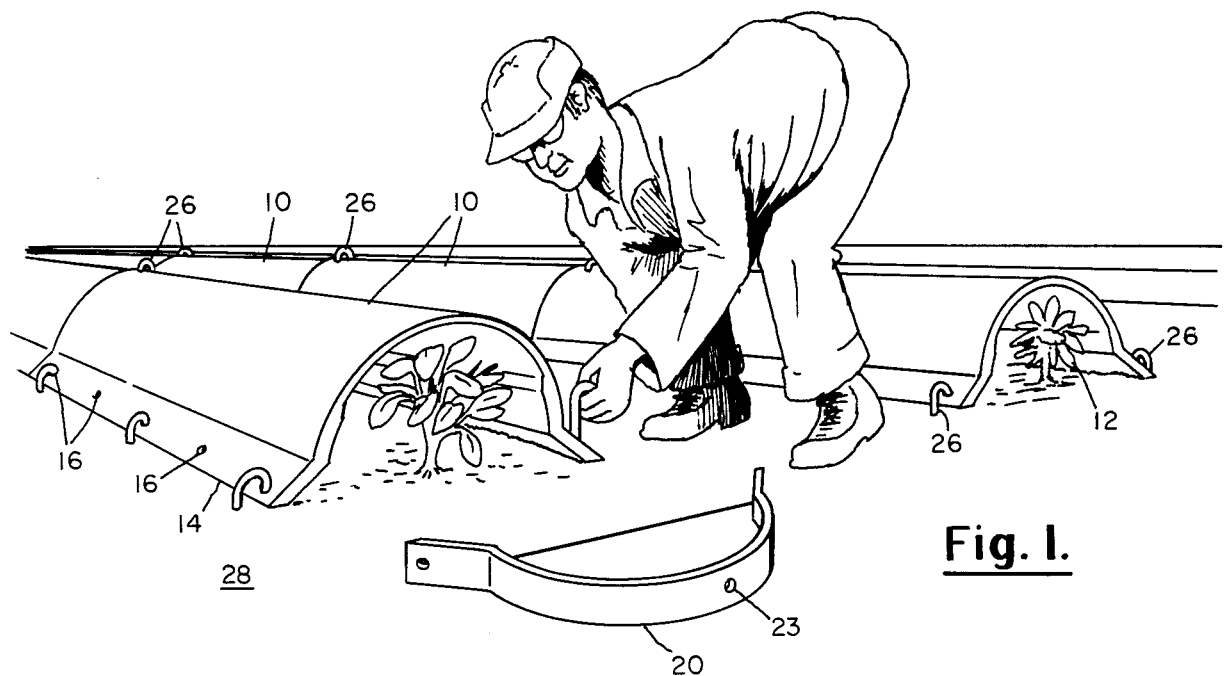
FIG. 1, is a third dimensional view of the invention in use showing the elongated cover sections covering two rows of growing plants.
Figure 2:
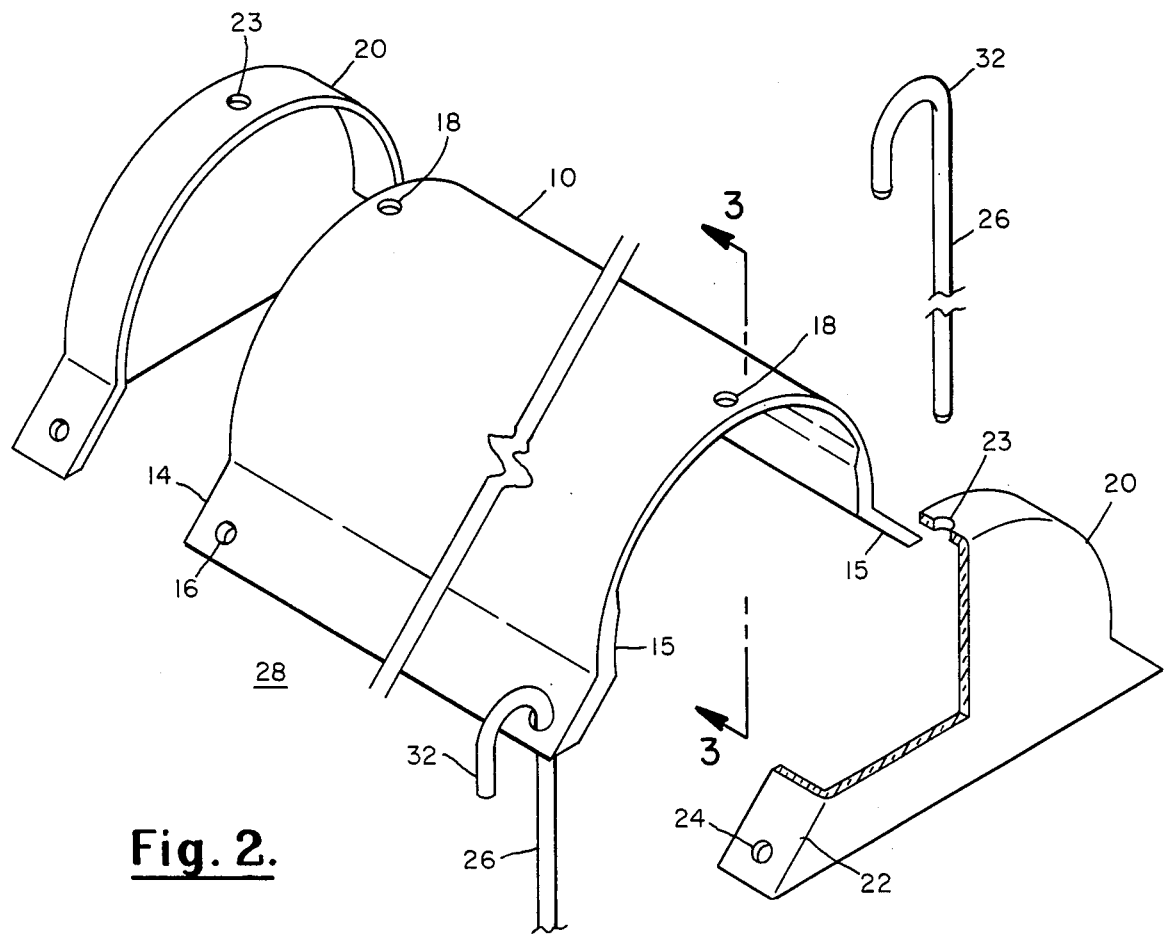
FIG. 2, is a third dimensional drawing of a section of the device showing the cover section with end caps positioned for assembly.
Figure 3:
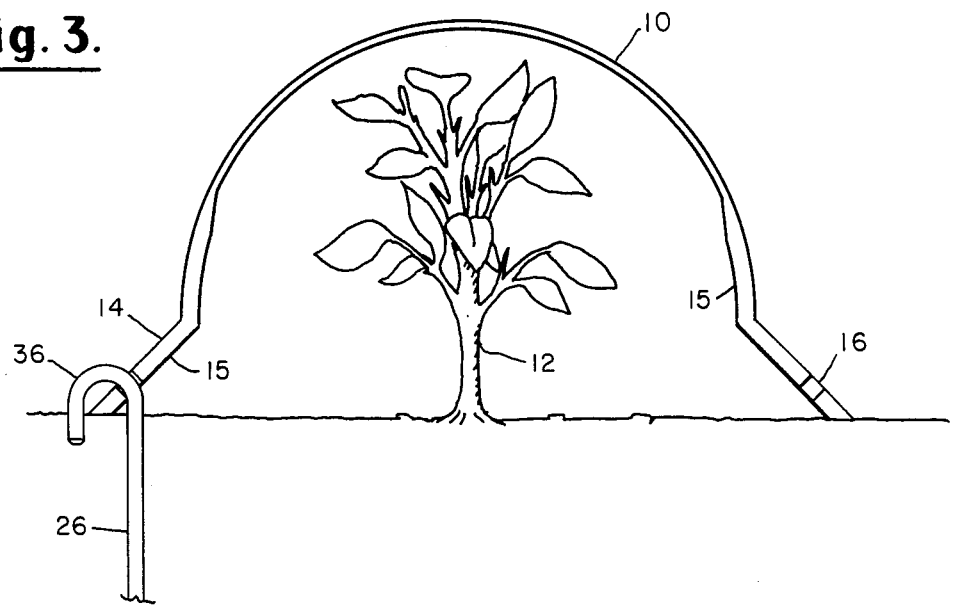
FIG. 3, is a view of the invention taken along lines 3—3 of FIG. 2 showing the cover on the ground in its protective position covering the plant.

Referring to the drawings and in particular to FIGS. 1 and 2, 10 represents a cover section of the device extending over plants 12 positioned in a row. The cover section 10 is generally a cylindrical horse-shoe shaped cylinder with a flange 14 on the lateral end portions of the cylinder. The flange 14 has a thicker cross sectional area that extends a short distance upward of the balance of cover section 10. The purpose of this thicker flange 14 is to add strength and durability to the flange 14 and to withstand hinging wear caused by rotation on stakes 26, later described. Flange 14 has a series of hinging holes 16 therethrough at intervals of about two feet. In addition cover section 10 has an end hole 18 on its end portion.

And end cap 20 has the approximate cross section of cover section 10 and is adapted to fit over the end of cover section 10 to seal the end portion thereof. End cap 20 has an approximate cylindrical shape with end cap flanges 22 extending from the lateral portion. The end cap flanges 22 have end cap flange holes 24 therethrough which match with the end hinging holes 16 when end cap 20 is positioned on the end portion of cover section 10. A cap hole 23 extends through the top of end cap 20 and matches with end hole 18 when end cap 20 is positioned on cover section 10. In this position end cap flange hole 24 and hinging holes 16 are positioned one above the other. A cap hole 23 through the top portion of end cap 20 is adapted to match with end hole 18 when the end cap 20 is placed over the end portion of cover section 10.

A stake 26 is adapted to extend through hinging holes 16 and into the ground 28. Stake 26 has a curved end portion 32 which extends over flange 14 when the stake 26 is driven into the ground 28, thus securely anchoring cover section 10.

In operation, cover section 10 is placed over a row of plants 12 and end caps 20 fitted over the end portion of the cover section 10. Cover section 10 may be coupled to adjacent cover section 10 to form a line of cover sections extending over a row of plants 12 as in FIG. 1. In this mode, end holes 18 of each cover section 10 are aligned and a stake 26 placed through the aligned end hole 18 and into the ground. Thus an extended number of cover sections 10 may be coupled together to protect an extended row of plants 12. Stake 26, thus is utilized as a coupling pin between cover sections 10, as well.

As may be seen, when cover section 10 is staked to the ground 28 by stakes 26, the plants 12 are secured with a "hothouse" environment. Sunlight will penetrate the translucent cover section 10 to produce a warming effect within the cover section 10 to warm the plants 12. Likewise the plants are protected from inclement temperatures, rain, hail, wind and other natural phenomena which would inhibit their growth or damage them.

Figure 4:
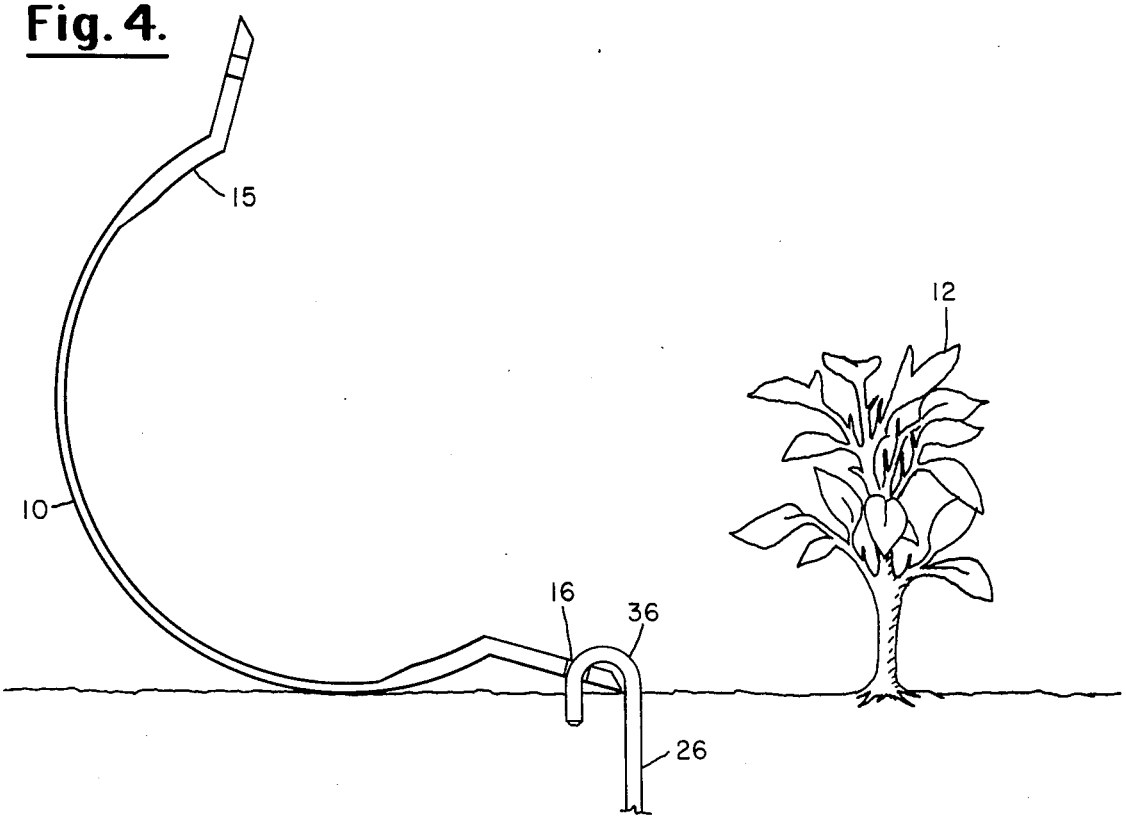
FIG. 4, is an end view of the invention of FIG. 3, but showing the cover in the open or hinged position exposing the plant.

To open the cover section 10, the stakes 26 on one side may be removed and cover section 10 pivoted upon the curved end portion 32 of stakes 26, as may be seen in FIG. 4. In this open mode, the plants are exposed to the outside weather, and may receive rain and sunlight as is desired. For example, the plants may be left exposed to the outside environment during the day and covered during the night.

To cover the exposed plants, cover section 10 is again rotated about the stakes 26 until it again contacts the ground 28. At that point stakes 26 may be reinserted through end cap flange holes 24 to restake the cover section 10 to the ground. End caps 20 may be reinstalled on the end portion of cover section 10 and pinned thereto by means of stake 26 passing through end hole 18, cap hole 23 and into the ground 28.

The versatility of this invention is readily apparent. The cover sections 10 may be removed, stacked one upon the other and stored in a convenient place when not in use, as may be the end caps 20 and stakes 26. The material most adaptive for cover section 10 and end caps 20 has been translucent fiberglas. This substance admits light well, has insulating qualities to preserve the internal heat in the cover section 10, and is very durable. However, it is within the contemplation of this invention that other transparent or translucent heat insulating materials may be used. For example, other plastic materials, polyethylene, glass, etc. The material which is most effective is one which admits light, and which acts as an insulator.

I claim:

1. A portable plant protection device adapted to be placed over growing plants in the ground, comprising in combination:
    a light admitting semi-cylindrically shaped first cover section, comprised of heat-insulating fiberglas;
    flange sections on either side of said cover section and coupled thereto, said flange section angled to extend from said semi-cylindrical section so that only the ends of said flanges support said device, said flange sections having a plurality of hinging holes therethrough;
    an end cap adapted to removably fit over said end portion of said first cover section and having two hinging holes therethrough adjacent to said flange section and a centrally positioned coupling hole therethrough;
    hinging means extending through each of said flange sections and into the ground, said hinging means comprising in combination:
    a plurality of removable J-shaped first stakes extending through said hinging holes on one side of said cover section and into the ground;
    a plurality of removable J-shaped second stakes extending through the hinging holes of the opposite flange section and into the ground;
    whereby either said first plurality of stakes or said second plurality of stakes may be removed allowing said cover section to pivot and hinge on said remaining stakes and to be positioned on either side of said plants.

2. The combination as claimed in claim 1, in which said flange sections are comprised of thickened reinforced fiberglas.

3. The combination as claimed in claim 2, having a section coupling means, said coupling means comprising in combination:
    a second cover section having a coupling hole therethrough positioned on the central portion of said end section and aligning with the coupling hole on the end portion of said first cover section;
    a J-shaped coupling stake extending through said coupling holes on said first and second cover section and into the ground.

4. The combination as claimed in claim 3, having a coupling stake extending through said coupling hole in said end cap and said coupling hole in said cover section and into the ground.

5. The combination as claimed in claim 4, in which said first and second cover section has thickened reinforced flange sections which are positioned at about a 45 degree angle with said first and second cover sections.

6. The combination as claimed in claim 5, comprising a plurality of cover sections longitudinally coupled to said second cover section by stake means.

7. The combination as claimed in claim 6, in which said first and second cover sections may vary in length from two feet to twelve feet and have a vertical height from the ground from eight inches to sixteen inches.

* * * * *